Sept. 15, 1959    J. MÜLLER    2,904,478
PRODUCTION OF HYDROGEN PEROXIDE
Filed Dec. 7, 1955    2 Sheets-Sheet 1
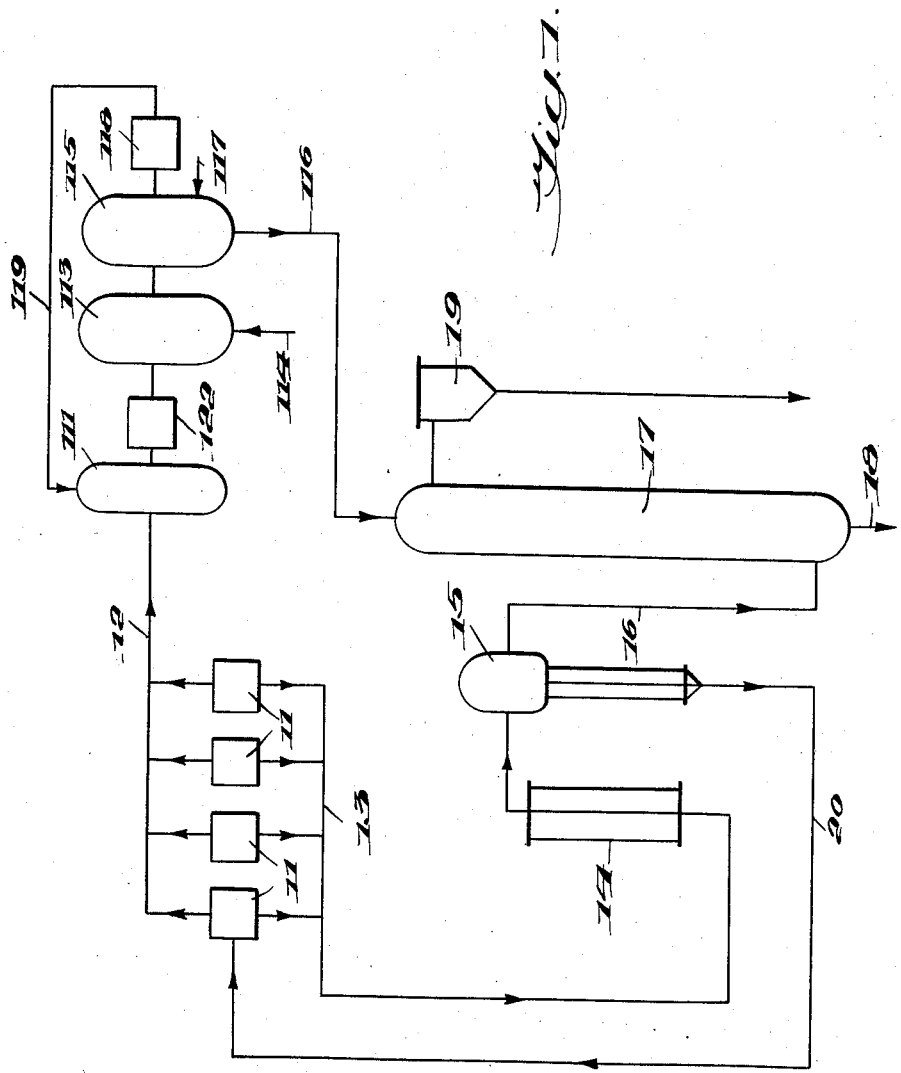
INVENTOR
JOSEF MÜLLER,
BY
ATTORNEYS Sept. 15, 1959 J. MÜLLER 2,904,478
PRODUCTION OF HYDROGEN PEROXIDE
Filed Dec. 7, 1955 2 Sheets-Sheet 2
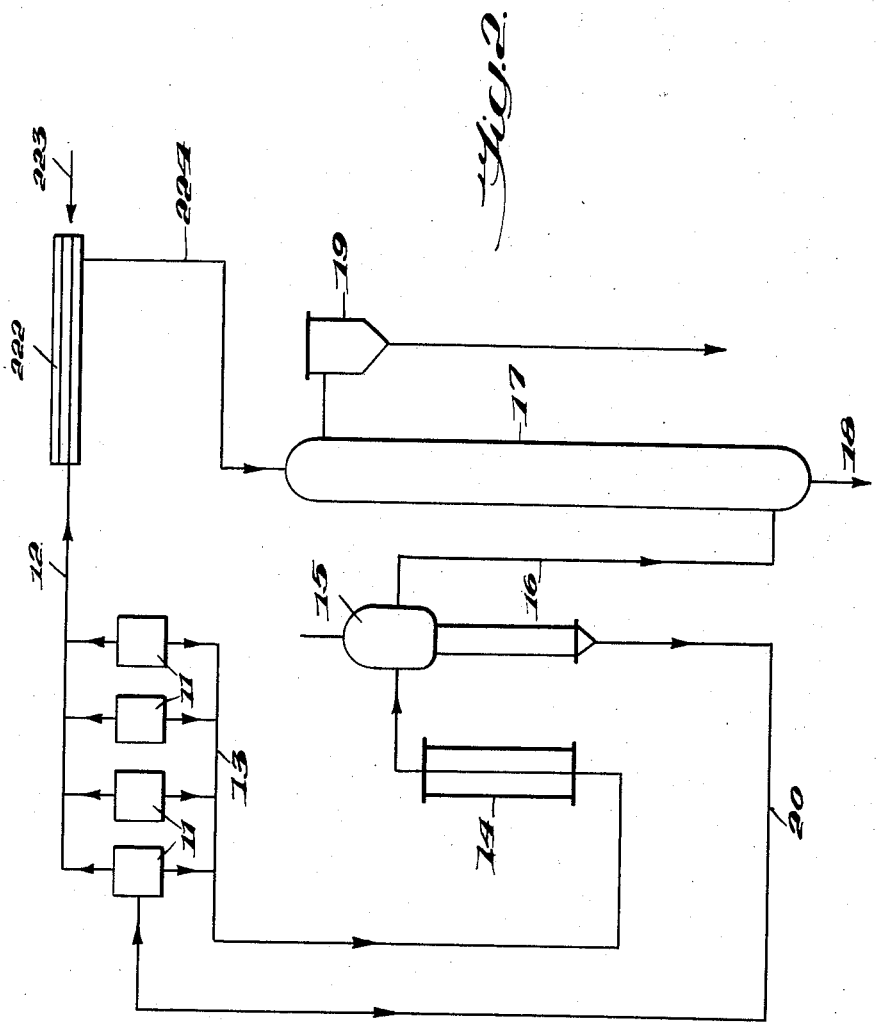
INVENTOR
JOSEF MÜLLER,
BY
ATTORNEYS

United States Patent Office 2,904,478
Patented Sept. 15, 1959

2,904,478

PRODUCTION OF HYDROGEN PEROXIDE

Josef Müller, Rheinfelden, Baden, Germany, assignor to Deutsche Gold- und Silber-Scheideanstalt vormals Roessler, Frankfurt am Main, Germany Application December 7, 1955, Serial No. 551,677

Claims priority, application Germany December 8, 1954

8 Claims. (Cl. 204—84)

The present invention relates to improvements in the production of hydrogen peroxide by combination of chemical processes for the production of hydrogen peroxide with the production of hydrogen peroxide by the electrolytic oxidation of sulfuric acid or its salts.

It is known that hydrogen peroxide can be produced electrochemically by the anodic oxidation of sulfuric acid or its salts to produce persulfuric acid or persulfates as anode products which are subjected to hydrolysis and subsequently distilled. In such electrolytic process hydrogen is produced at the cathode, but for numerous reasons such hydrogen was generally not utilized when such process was carried out on a technical scale. It is furthermore known that hydrogen peroxide can be produced by the catalytic combustion of hydrogen in the presence of oxygen or oxygen containing gases. Furthermore, it is also known that hydrogen can be used to hydrogenate suitable organic compounds such as anthraquinone and azotoluol to produce compounds containing hydrogen atoms which are easily split off and then to subject these compounds to auto-oxidation with elemental oxygen. These chemical procedures usually lead to the production of aqueous solutions of hydrogen peroxide of relatively low concentration which are more or less difficult to work up and therefore renders technical scale use of such processes problematical.

According to the invention, it was found that the hydrogen produced at the cathode in the electrolytic production of hydrogen peroxide could be utilized with technical and economic advantage by converting such hydrogen directly with oxygen or oxygen containing gases to hydrogen peroxide indirectly, for example, by procedures such as have already been mentioned above. In accordance with a preferred modification of the invention, the relatively dilute aqueous hydrogen peroxide produced is either entirely or partly worked up by distillation or fractional condensation jointly with the hydrogen peroxide obtained by the decomposition of the persulfuric acid or persulphates obtained in the electrolytic process. This combination provides a process for the production of hydrogen peroxide with optimal use of materials and energy.

The process according to the invention therefore does not only reside in utilization of the hydrogen produced in the electrolytic process but preferably in combining the working up of the hydrogen peroxide produced in the chemical processes from the hydrogen with that produced in the electrolytic process. It is especially desirable to collect the cathodic hydrogen produced in the electrolytic process as completely in as pure a form as possible. This, for example, can be effectively achieved with the electrolytic process described in U.S. application Serial No. 327,221, filed December 22, 1952, now Patent No. 2,795,541.

The cathodic hydrogen thus obtained can, for example, be converted to hydrogen peroxide by known catalytic combustion process or by silent electric discharges with oxygen or oxygen containing gases, and the resulting products worked up jointly with the products of the electrolytic production of hydrogen peroxide.

In accordance with another modification of the invention, in which especially pure hydrogen is desired, the cathodic hydrogen formed in the electrolytic process is employed to hydrogenate organic compounds which form substances containing hydrogen atoms which are easily split off. The hydrogenated compounds are then treated with elemental oxygen to split off hydrogen peroxide with reformation of the starting compound which can be recycled. Organic compounds which upon hydrogenation form substances with labile hydrogen atoms which can undergo auto-oxidation with elemental oxygen with the formation of hydrogen peroxide, for example, are as follows: anthraquinone [1] and its alkyl derivatives, especially, 2-ethyl anthraquinone, and azotoluene.

According to still another modification of the invention, the cathodic hydrogen formed in the electrolytic process can be employed to reduce cadmium hydroxide, such as is obtained by treating cadmium amalgam with water in the presence of oxygen, to metallic cadmium. This cadmium is then amalgamated with mercury. When such cadmium amalgam is decomposed with water in the presence of oxygen, hydrogen peroxide and cadmium hydroxide are formed and the latter can be again reduced and recycled. The cycle is illustrated by the following equation:

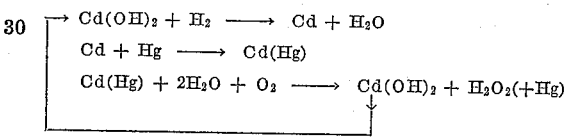

In the chemical processes mentioned, the hydrogen peroxide is usually produced as a rather dilute aqueous solution, the actual concentration depending upon the quantity and type of solvent employed and the partition coefficient of hydrogen peroxide. These dilute solutions can with great advantage be worked up jointly with the products obtained in the electrolytic production of hydrogen peroxide. It is of especial advantage that it is thereby no longer necessary to carry out the chemical processes, right from the start, under such conditions which lead to as high a concentration of hydrogen peroxide as possible and consequently undesired side reactions, for example, in the oxidation to a great extent no longer need to be taken into consideration.

In working up the electrolytic solution of the electrolytic process, relatively large quantities of steam became available as generally vapor concentrations of 7 to 10% of hydrogen peroxide are worked with. The heat content of these large quantities of steam which is made available during the subsequent fractionation, can be economically and simply utilized for concentrating the dilute solutions obtained in the chemical portion of the process. For example, very dilute peroxide solutions resulting from the chemical processes can be worked up satisfactorily without additional expense by a preferred modification according to the invention in which such dilute solutions are supplied as a reflux in the fractional condensation of the vaporized $H_2O_2$ obtained in the electrolytic process.

As the hydrogen which is produced at the cathode in the electrolytic process is of high purity and is produced in the catalytic process as a by-product, it can be successfully utilized even in procedures, such as catalytic combustion, which normally cannot be economically carried out by themselves because of the extremely low yields.

[1] U.S. Patent 2,158,525.

In the accompanying drawings:

Fig. 1 diagrammatically shows an apparatus carrying out a modification of the process according to the invention and Fig. 2 diagrammatically shows a modified form of apparatus for carrying out another modification of the process according to the invention.

The following examples will serve to illustrate several preferred modifications according to the invention:

*Example 1*

1000 kg. of 35% by weight hydrogen peroxide were produced per 24 hours in an electrolytic plant. This plant had a current capacity of 5×7000 amp.=35,000 amp. for the anodic and cathodic current work. The process employed was that of application Serial No. 327,221, filed December 22, 1952, with a voltage of 4.35 volts per cell and with a total yield of 70% for the anodic process (current yield×distillation yield). Consumed 10 kwh. of direct current for each kilogram of 100% $H_2O_2$ produced.

This quantity current simultaneously produced 14.64 m.$^3$ of hydrogen gas per hour, of which 95% could be utilized when the process of Serial No. 327,221 was employed.

In working up the persulfuric acid which was anodically produced, which amounted to 6500 liters of 33% $H_2S_2O_8$ per 24 hours under the conditions specified above, 850 liters of reflux were obtained during fractional condensation to 35% $H_2O_2$. This quantity of liquid which is condensed out of the exhaust steam can be replaced by a more or less concentrated $H_2O_2$ solution obtained by another method of production whose $H_2O_2$ content is then concentrated to 35% by weight substantially without loss and without additional cost. The heat content of the exhaust steam can also be further utilized to pre-concentrate the foreign $H_2O_2$ solution in a heat exchanger before it is supplied as reflux to the fractional condensation. The condensed exhaust steam is utilized for diluting the electrolyte from the electrolytic process after the distillation.

The cathodic hydrogen produced as a by-product in the electrolytic process was employed to hydrogenate a solution of an alkyl anthraquinone, for example, 2-ethyl anthraquinone, in a suitable solvent, for instance benzene and secondary alcohols, in a known manner in the presence of a suitable catalyst, for instance, palladium metal on aluminum oxide. The anthrahydroquinone formed by the hydrogenation at a temperature of 20° through 30° C. was then oxidized with oxygen or oxygen containing gases to form hydrogen peroxide and reform the alkyl anthraquinone which was separated and recycled to the hydrogenation step. The resulting hydrogen peroxide solution was then concentrated with the excess heat resulting from the distillation process employed in the recovery of hydrogen peroxide from the electrolytic process.

The anthraquinone process for the production of hydrogen peroxide requires about 80 cubic meters of hydrogen for the production of 100 kg. of 100% $H_2O_2$. The described electrolytic process delivered 16.64 cubic meters of hydrogen per hour, of which 95% could be utilized for the anthraquinone hydrogenation or, in other words, 13.9 cubic meters per hour, or 334 cubic meters per 24 hours, were available for the anthraquinone process so that such process can produce about 400 kg. of 100% $H_2O_2$ per 24 hours which is more than is produced by the electrolytic process.

Depending upon the concentration of the $H_2O_2$ solution obtained in the anthraquinone process, a larger or smaller proportion can be worked up in the distillation procedure of the electrolytic process. When it is taken into consideration that the cathodic hydrogen of the electrolytic process is almost costless, aside from erection costs for the plant employed for its utilization and that also a large proportion of heat necessary for the concentration of the solutions resulting from the anthraquinone process is available from the electrolytic process, the combination according to the invention of the electrolytic process with the chemical processes for the production of $H_2O_2$ provides an extraordinarily cheap method for the production of $H_2O_2$. Also, with such combination it is possible to operate the organic chemical process with concentrations below the danger limit as to the working up and concentration of the solutions produced is considerably simplified. The working up of the $H_2O_2$ solutions produced in the electrolytic and chemical processes can also, if expedient, be distilled jointly and in this manner couple the distillation and fractionation procedures. The process according to the invention therefore renders it possible to reduce the current costs as well as the steam costs to about one half of that of the previous procedures.

The procedure of Example 1 is diagrammatically illustrated in Fig. 1 of the drawings. In such figure, 11 designates the electrolytic cells in which persulfuric acid is produced by anodic oxidation of sulfuric acid. The cathodic hydrogen produced is collected in conduit 12. The anolyte produced in the electrolytic cells flows to the distillation column 14 through conduit 13, and then to column 15 in which the $H_2O_2$ produced is blown out with direct steam. The resulting $H_2O_2$ vapors are supplied to condenser 17 through conduit 16, whereas the sulfuric acid separated in column 15 is recycled to the electrolytic cells through conduit 20. The hydrogen peroxide vapors are fractionally condensed in condenser 17 and the condensed hydrogen peroxide withdrawn at 18. The water vapors are condensed at 19.

The cathodic hydrogen collecting in conduit 12 is supplied to the anthraquinone reducer 111 and the resulting hydrogenation product is passed over filter 122 to the oxidation vessel 113 in which the hydrogenation product is oxidized with air introduced at 114 with the reformation of the anthraquinone with simultaneous production of $H_2O_2$. The $H_2O_2$ produced is separated in extractor 115 and withdrawn at 116. Water is supplied to the extractor at 117. The reformed anthraquinone after cleaning in 118 is recycled to the reducer 111 through conduit 119. The dilute aqueous hydrogen peroxide drawn off at 116 can be used as such, but according to the preferred modification of the invention, it is supplied to the reflux in a suitable location in fractional condenser 17 as shown in the drawing, concentrated therein and withdrawn as a concentrated commercial product at 18 together with the electrolytically produced $H_2O_2$.

*Example 2*

$H_2O_2$ was produced electrolytically from sulfuric acid in the same manner as described in Example 1, but instead of employing the cathodic hydrogen produced to produce additional $H_2O_2$ by the anthraquinone process, it was employed to reduce cadmium hydroxide at temperatures below 300° C. to cadmium. The resulting cadmium was dissolved in mercury to produce an amalgam and this amalgam in finely subdivided form was reacted with finely subdivided water and oxygen or oxygen containing gases, whereby cadmium hydroxide was reformed with simultaneous production of $H_2O_2$. The cadmium hydroxide was filtered off and recycled for reduction to cadmium with the cathodic hydrogen and the resulting cadmium again dissolved in mercury and reused to form further $H_2O_2$. The pure filtered aqueous $H_2O_2$ solution had a concentration up to 3% which could be used as such or preferably employed as reflux in the fractional condensation of the $H_2O_2$ produced by the electrolytic process as described in Example 1. The purely chemical process of producing $H_2O_2$ via cadmium amalgam could be modified in that the cadmium amalgam is produced electrolytically in a known manner from a cadmium sulfate solution with a mercury cathode. It was, however, found that the purely chemical process described is preferred in view of its simplicity and especially in apparatus-wise simplicity.

Example 3

H₂O₂ was produced electrolytically from surfuric acid in the same maner as described in Example 1, but instead of employing the cathodic hydrogen produced to produce additional H₂O₂ by the anthraquinone process, it was used to form H₂O₂ by catalytic combustion employing palladium metal as a catalyst as shown diagrammatically in Fig. 2 of the drawings. In such figure, all of the apparatus is the same as in Fig. 1, except that the cathodic hydrogen collecting in conduit 12 is supplied to the catalytic furnace 222 instead of to the anthraquinone reducer 111, into which oxygen or air is introduced for the catalytic combustion through conduit 223. The resulting H₂O₂ is supplied together with water as reflux to the head of condenser 17 over conduit 224 and is concentrated in such condenser and withdrawn at 18 jointly with electrolytically produced H₂O₂.

Example 4

Hydrogen produced in the electrolysis of persulfuric acid is mixed with 4% of oxygen or the respective amount of air and the resulting mixture passed through an ozonisator adapted to the recovery of hydrogen peroxide. Substantially, this ozonisator consists in a system of two concentrically adjusted glass tubes with a narrow interspace of about 0.5 through 1 mm. The mixture consisting of oxygen and hydrogen flows through the casing space formed by the two glass tubes, thereby being exposed to the influence of the silent electric discharge occurring between the two glass tubes; the electric discharge is obtained with a frequency of over 500 periods. As the process which combines the electrolytic production of hydrogen peroxide with the recovery of hydrogen peroxide out of a silent electric discharge does not need high concentration in the second stage, the mixture consisting of oxygen and hydrogen may be passed with a very high velocity of flow through the ozonisator; any difficulties in view of the cooling are thereby avoided and the yields comparatively high. The thus produced hydrogen peroxide is combined with the hydrogen peroxide produced by the electrolysis of persulfuric acid and both products subjected to a rectification process. The process according to this example is specially suited for plants with strong seasonal fluctuations in the supply of electric energy.

I claim:

1. In a process for the production of hydrogen peroxide by electrolytic oxidation of an anolyte containing SO₄ anions to produce a solution of a per-compound selected from the group consisting of persulfuric acid and its salts with simultaneous production of cathodic hydrogen as a by-product, decomposing said per-compound solution to produce a hydrogen peroxide solution and recovering hydrogen peroxide from such solution by distilling off hydrogen peroxide with the aid of a fractionating column operating with reflux, the steps which comprise collecting the by-product cathodic hydrogen, employing said cathodic hydrogen for the chemical production of a dilute solution of hydrogen peroxide and supplying at least a portion of said dilute hydrogen peroxide solution to said fractionating column as reflux.

2. The process of claim 1 in which said cathodic hydrogen is converted to hydrogen peroxide by catalytic combustion in the presence of oxygen.

3. The process of claim 1 in which said cathodic hydrogen is converted to hydrogen peroxide by silent electric discharge in the presence of oxygen.

4. The process of claim 1 in which said chemical production of a dilute solution of hydrogen peroxide comprises hydrogenation of an organic compound the hydrogenation products of which contain hydrogen atoms which are easily split off and react with molecular oxygen to produce hydrogen peroxide and reaction such hydrogenation product with molecular oxygen to produce hydrogen peroxide.

5. The process of claim 1 in which said chemical production of a dilute solution of hydrogen peroxide comprises hydrogenation of an anthraquinone to produce an anthrahydroquinone and reacting such anthrahydroquinone with molecular oxygen to produce hydrogen peroxide.

6. The process of claim 1 in which said chemical production of a dilute solution of hydrogen peroxide comprises reduction of cadmium hydroxide with said cathodic hydrogen to produce cadmium, treating such cadmium to form a cadmium amalgam, treating such cadmium amalgam with oxygen in the presence of water to produce hydrogen peroxide and cadmium hydroxide and recycling the cadmium hydroxide to the reduction step.

7. In a process for the production of hydrogen peroxide by electrolytic oxidation of an anolyte containing SO₄ anions to produce a solution of a per-compound selected from the group consisting of persulfuric acid and its salts with simultaneous production of cathodic hydrogen as a by-product, decomposing said per-compound solution to produce a hydrogen peroxide solution, vaporizing hydrogen peroxide from said solution with steam and fractionally condensing the resulting steam hydrogen peroxide vapors to condense a concentrated hydrogen peroxide solution, the steps which comprise collecting the by-product cathodic hydrogen, employing said cathodic hydrogen for the chemical production of a dilute solution of hydrogen peroxide and supplying the chemically produced hydrogen peroxide solution as a reflux to the fractional condensation of the steam hydrogen peroxide vapors.

8. The process of claim 7 in which the exhaust steam from the fractional condensation is employed to preconcentrate the chemically produced dilute hydrogen peroxide solution before it is supplied as a reflux to the fractional condensation of the steam hydrogen peroxide vapors.

References Cited in the file of this patent

UNITED STATES PATENTS

| 916,900 | Teichner | Mar. 30, 1909 |
|---|---|---|
| 1,766,722 | Nitzschke et al. | June 24, 1930 |
| 2,158,525 | Riedl et al. | May 16, 1939 |
| 2,795,541 | Muller | June 11, 1957 |

FOREIGN PATENTS

| 25,681 | Great Britain | 1911 |